United States Patent Office 2,930,752
Patented Mar. 29, 1960

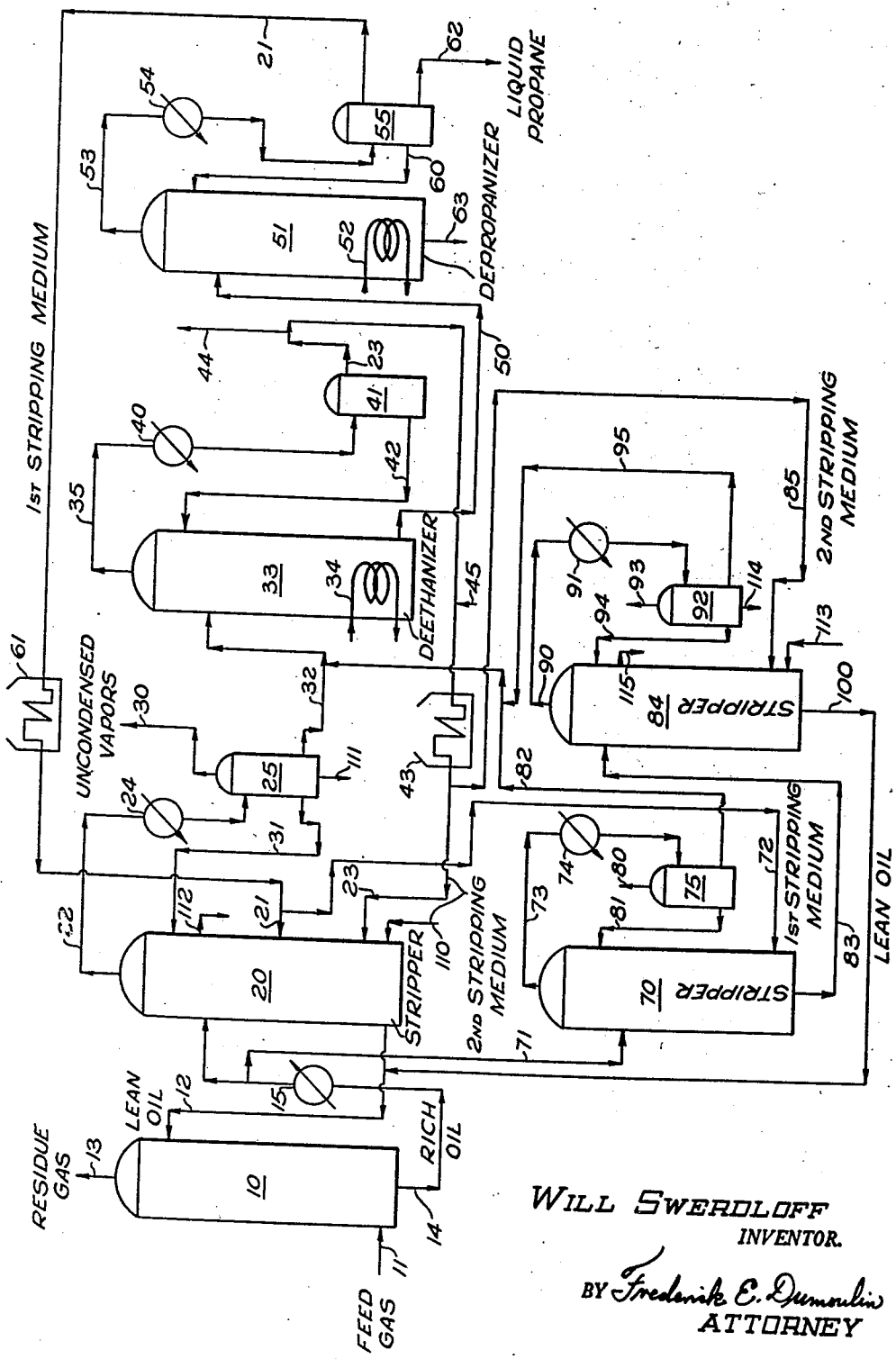

2,930,752

PROCESS FOR STRIPPING OF ABSORPTION LIQUIDS

Will Swerdloff, Dallas, Tex., assignor, by mesne assignments, to Socony Mobil Oil Company, Inc., New York, N.Y., a corporation of New York Application June 12, 1952, Serial No. 293,060

2 Claims. (Cl. 208—341)

This invention relates to the treatment of a gas mixture with an absorption liquid to separate desired constituents from the gas mixture by solution in the absorption liquid and relates more particularly to the treatment of the absorption liquid to remove therefrom the dissolved desired constituents separated from the gas mixture.

Where it is desired to separate a desired gas constituent or group of desired gas constituents in a gas mixture from another gas constituent or other gas constituents in the mixture, the separation is often effected by contacting the gas mixture with a suitable absorption liquid under suitable conditions of temperature and pressure whereby the desired gas constituent or constituents are absorbed and dissolved in the absorption liquid preferentially to the other constituent or constituents of the gas mixture. Thus, in the separation of heavier hydrocarbons from lighter hydrocarbons contained in a hydrocarbon gas mixture, such as a gas mixture from a petroleum well, the gas mixture is contacted with an oil as the absorption liquid whereby the heavier hydrocarbons are absorbed and dissolved in the oil preferentially to the lighter hydrocarbons. Following the absorption step, the rich oil containing the dissolved constituents of the hydrocarbon gas mixture is subjected to a stripping operation to remove and recover the desired gas constituents and to regenerate the absorption oil for recycling to the absorption step. Commonly, in the separation of heavier hydrocarbons from lighter hydrocarbons employing an oil for the absorption step, the rich oil from the absorption step is stripped by steam distillation, i.e., by blowing steam through the oil and collecting an overhead composed of condensed steam, liquid hydrocarbons, and some uncondensed vapors. While steam distillation of rich absorption oil is extensively practiced, it has been desired to decrease or eliminate the use of steam in the stripping operation.

It is an object of this invention to provide a method for stripping dissolved gas constituents from an absorption liquid. It is another object of this invention to decrease or eliminate the use of steam in stripping dissolved gas constituents from an absorption liquid. These and other objects of the invention will become apparent from the following description thereof.

In accordance with my invention, absorption liquid which has been contacted in an absorption step with a feed gas stream comprising a mixture of gas constituents and which has preferentially absorbed a desired gas constituent from the mixed gas stream is stripped in a two-stage stripping operation wherein a first stripping medium is blown through the absorption liquid in the first stripping stage and a second stripping medium is blown through the liquid in the second stripping stage. The first stripping medium is a hydrocarbon gas such as ethane, propane, or butane. Preferably, the first stripping medium consists entirely or substantially entirely of a single gas constituent although a mixture of hydrocarbon gases containing constituents whose presence in the mixture will not substantially interfere with subsequent condensation of the overhead from the first stripping stage may be employed. The absorption liquid, following the first stripping stage, is more or less saturated with the first stripping medium and this first stripping medium is removed from the absorption liquid in the second stripping stage. The second stripping medium is a gas which is capable of stripping the first stripping medium from the absorption oil. The second stripping medium may consist entirely or substantially entirely of a single gas constituent or may consist of a mixture of gases. The second stripping medium, further, is a gas, or mixture of gases, different than any gas, or gases, which it is desired to absorb from the feed gas stream in the absorption step since the presence in the second stripping medium of any gas, or gases, which it is desired to absorb from the feed gas stream in the absorption step will decrease the extent to which the absorption liquid is capable of absorbing these constituents from the feed gas stream. However, it is not absolutely essential that the second stripping medium be entirely free of constituents desirably absorbed from the feed gas stream since the presence of small amounts of these constituents in the second stripping medium may decrease the ability of the absorption liquid to absorb these constituents from the feed gas stream to an extent immaterial from the standpoint of the overall efficiency of the absorption and stripping operations. The second stripping medium may be methane, ethane, or steam.

Stripping in the first stripping stage is effected by blowing the first stripping medium through the absorption liquid. As stated, ethane, propane, or butane may be employed as the first stripping medium. From the standpoint of ease of condensing the first stripping medium in the overhead from the first stripping stage, butane would be preferable as the first stripping medium since butane is more easily condensed than ethane or propane. However, from the standpoint of the weight of first stripping medium required to strip the absorption oil in the first stripping stage and the weight of second stripping medium required to strip the first stripping medium from the absorption oil in the second stripping stage, ethane would be desirable as the first stripping medium since, compared to propane or butane, less ethane is required to strip the absorption oil in the first stripping stage and less second stripping medium is required to strip ethane from the absorption oil in the second stripping stage. Generally, propane is preferred from both standpoints as the first stripping medium.

The amount of the first stripping medium to be employed per unit amount of rich absorption liquid will depend upon the extent to which the desired gas feed stream constituents are to be removed from the absorption liquid and also upon the concentration of these constituents in the absorption liquid. The amount of the first stripping medium to be employed will also depend upon the temperature and pressure of the rich absorption liquid and the first stripping medium and, to some extent, upon the composition of the absorption liquid per se.

As stated, following the first stripping step, the absorption liquid will be more or less saturated with the first stripping medium. The function of the stripping in the second stripping stage is to strip the first stripping medium from the absorption liquid and to regenerate the absorption oil for re-use in the absorption step. Methane, ethane, or steam will effect this purpose. Ethane, of course, would not be employed where it is desired to absorb ethane from the feed gas stream in the absorption step or where ethane is employed as the first stripping medium. Where steam is used as the second stripping medium, the amount will be substantially less than the amount that would be required should the first stripping step have not been employed. However, the use of steam can be completely eliminated by employing methane or ethane as the second stripping medium.

Stripping in the second stripping stage is effected by blowing the second stripping medium through the absorption liquid. The amount of second stripping medium to be employed will, similarly to the amount of the first stripping medium to be employed, depend upon the extent to which dissolved constituents are to be removed from the absorption liquid, the concentration of these constituents in the absorption liquid, the temperature and pressure of the absorption liquid and the second stripping medium, and the composition of the absorption liquid per se. Also, it is essential that an adequate amount of second stripping medium be available and be employed to attain the desired degree of stripping.

The invention is particularly applicable to the stripping of a hydrocarbon liquid such as gas oil, kerosene, mineral seal oil, gasoline, etc., employed for the separation of desired hydrocarbon gas constituents from a hydrocarbon gas stream such as a refinery gas, casing head gas, natural gas, etc.

The single figure is a flowsheet schematically illustrating an embodiment of the invention.

Referring to the figure, a feed gas stream containing a gas constituent or gas constituents which are to be separated from another constituent or other constituents is passed to an absorber 10 through line 11. For purposes of illustration, the feed gas stream will be regarded as a gas stream from a petroleum gas well and as containing methane, ethane, propane, butane, pentane, and higher hydrocarbons, of which the propane, butane, pentane, and higher hydrocarbons are to be separated from the methane and ethane. The feed gas stream rises upwardly through the absorber and is therein contacted countercurrently with a downwardly flowing stream of lean absorption oil entering the absorber through line 12. Flow rates, temperatures, and pressures are maintained in the absorber 10 in accordance with conventional practice so that the propane and the heavier hydrocarbons in the feed gas stream are preferentially absorbed. The unabsorbed gas constituents leave the absorber 10 through line 13 and the rich absorption oil leaves the absorption column through line 14. While, for purposes of simplifying the description of the absorption step a single absorber 10 is shown, it will be understood that the absorption step may be carried out employing a plurality of absorbers as well as employing subsequent pressure reduction on the rich oil and reabsorption of the flashed vapors.

The rich oil is heated in heater 15 and is passed to stripping column 20. The rich oil, in accordance with conventional practice, enters the stripping column and flows downwardly therethrough. Heated gaseous propane is blown into the stripping column through line 21 at a point in the column below the point at which the rich absorption oil enters and the gaseous propane flows upwardly through the column countercurrently to the downwardly flowing rich absorption oil. The propane is the first stripping medium and the blowing of the propane through the rich absorption oil is the first stripping stage of the process. The propane blowing through the rich absorption oil strips the absorption oil of the constituents of the feed gas stream dissolved therein and the gas constituents stripped from the absorption oil, as well as excess propane, leave the stripping column through line 22.

The propane blown through the downwardly flowing absorption oil more or less saturates the absorption oil with dissolved propane and the propane-saturated absorption oil flows downwardly into the lower section of the stripping column. Gaseous deethanizer overhead, from a source to be described later, consisting primarily of ethane and methane is blown into the lower section of the stripping column through line 23 and flows upwardly through the column countercurrently contacting the downwardly flowing absorption oil saturated with propane. The gaseous deethanizer overhead is the second stripping medium and the blowing of the gaseous deethanizer overhead through the propane-saturated absorption oil is the second stripping stage of the process. The gaseous deethanizer overhead strips the absorption oil of the propane dissolved therein and the propane stripped from the absorption oil, as well as excess deethanizer overhead leave the stripping column through line 22. The absorption oil leaves the stripping column through line 12 to be recycled as lean oil to the absorber 10. The absorption oil leaving the stripping column is more or less saturated with ethane and methane and will absorb ethane and methane in absorber 10 only to the extent that it is not saturated with ethane and methane upon entering the absorber. However, since it is not desired to absorb ethane or methane from the feed gas stream entering absorber 10, the saturation with ethane and methane of the absorption oil entering the absorber is ordinarily of no consequence and the absorption oil is lean oil with respect to its ability to absorb hydrocarbons other than ethane from the feed gas stream.

The gases leaving the stripper 20 through line 22 are cooled in condenser 24 and pass to separator 25. Uncondensed vapors pass out of the separator through line 30 and a portion of the condensed hydrocarbons is returned as reflux to stripper 20 through line 31. The remainder of the condensed hydrocarbons leaves the separator through line 32 and is passed to deethanizer 33 provided with reboiler 34 where it is fractioned to remove ethane. Methane contained in the condensed hydrocarbons is also removed in deethanizer 33 and the gaseous overhead consisting of ethane and methane leaves the deethanizer through line 35. A small amount of propane will also be removed from the condensed hydrocarbons in the deethanizer but this amount will usually be immaterial with respect to its effect upon the absorption of propane in absorber 10. The deethanizer overhead is cooled in condenser 40 and is passed to separator 41. A portion of the deethanizer overhead in separator 41 is returned as reflux to the deethanizer through line 42 and the remainder is passed through line 23 as the second stripping medium to stripper 20. The deethanizer overhead entering stripper 20 through line 23 is heated and vaporized, prior to entering the stripper, in heater 43. Excess deethanizer overhead not required for stripping in stripper 20 may be removed from the system through line 44 and in the event more second stripping medium is required for stripping in stripper 20 than can be supplied from the deethanizer, stripping medium may be added from an outside source through line 45 connected to line 23.

Bottoms from the deethanizer consisting of propane and heavier hydrocarbons absorbed from the feed gas stream leave the deethanizer through line 50 and enter depropanizer 51 provided with reboiler 52 where they are fractionated to remove propane. Gaseous propane leaves the depropanizer through line 53, is cooled in condenser 54, and is passed to separator 55. A portion of the condensed propane is returned as reflux to the depropanizer through line 60. Propane to be employed as the first stripping medium in stripper 20 is withdrawn through line 21 from separator 55, is vaporized in heater 61, and is passed to stripper 20. Excess liquid propane is removed from the separator through line 62. Hydrocarbons heavier than propane absorbed from the feed gas stream are removed from depropanizer 51 through line 63 and treated further, as by fractionation, if desired.

While the stripping of the rich oil in the first and second stripping stages has been described as being effected in a single stripper, it is possible to employ a separate stripper for each stripping stage. To carry out the two stripping stages in separate strippers, the rich oil in line 14 from absorber 10 is passed, after passing through heater 15, to stripper 70 through line 71 connected to line 14. Vaporized propane, the first stripping medium, enters the stripper 70 through line 72 connected to line 21 and is blown upwardly through the downwardly flowing absorption oil. The stripped vapors plus excess propane vapor pass overhead from the stripper through line 73, are cooled in condenser 74, and enter separator 75. Uncondensed gases leave the separator through line 80 and a portion of the condensed overhead is returned as reflux to the stripper through line 81. The remainder of the condensed overhead is passed through lines 82 and 32 to deethanizer 33.

The propane-saturated absorption oil leaves stripper 70 through line 83 and is passed to stripper 84. Gaseous deethanizer overhead, the second stripping medium, enters the stripper 84 through line 85 connected to line 23 and is blown upwardly through the downwardly flowing stream of absorption oil. The stripper vapors plus excess gaseous deethanizer overhead pass overhead from the stripper through line 90, are cooled in condenser 91, and enter separator 92. Uncondensed gases leave the separator through line 93 and a portion of the condensed overhead is returned as reflux to the stripper through line 94. The remainder of the condensed overhead is passed through lines 95, 82, and 32 to deethanizer 33. The stripped absorption oil is passed as bottoms from stripper 84 through line 100 and line 12 to absorber 10.

In the foregoing description, the second stripping medium was ethane and methane. As previously stated, other gases may be employed as the second stripping medium. Steam is often to be preferred as the second stripping medium. Where steam is employed as the second stripping medium, economy of stripping is effected to the extent that the first stripping medium has removed the more difficultly removable hydrocarbons absorbed by the absorption oil in the absorption step and the steam is required only to remove the first stripping medium and any of the hydrocarbons absorbed by the absorption oil in the absorption step and not removed in the first stripping stage. Furthermore, the use of steam as the second stripping medium avoids any difficulties arising from the use of a non-condensable gas as the second stripping medium.

Where steam is to be employed as the second stripping agent and the first and second stripping stages are to be carried out in a single stripper, steam may be admitted to stripper 20 through line 110. The steam blows upwardly through the downwardly flowing absorption oil to strip the absorption oil of the dissolved first absorption medium. Uncondensed steam passes overhead through line 22 with the other vapors and is condensed in condenser 24. The resulting water is removed from separator 25 through line 111 and water which may enter stripper 20 through line 31 or be formed by condensation of steam in the upper portion of stripper 20 may be removed from stripper 20 through line 112 leading to an accumulating tray (not shown) within the stripper. Thereafter, operations are similar to those previously described except that the entire amount of vapors leaving accumulator 41 is removed from the system through line 44.

To employ steam as the second stripping medium where the first and second stripping stages are carried out in separate strippers, steam is passed into stripper 84 through line 113. The steam blows upwardly through the downwardly flowing absorption oil to strip the absorption oil of the dissolved first absorption medium and steam and other vapors pass out of the stripper through line 90. The vapors are cooled in condenser 91 and the resulting water is removed from separator 92 through line 114. Water which may enter stripper 84 through line 94 or be formed by condensation of steam in the upper portion of stripper 84 may be removed from the stripper through line 115 leading to an accumulating tray (not shown) within the stripper. Thereafter, operations are similar to those previously described except that the entire amount of ethane leaving separator 41 is removed from the system through line 44.

Having thus described my invention, it is to be understood that such description has been given by way of illustration and example and not by way of limitation, reference for the latter purpose being had to the appended claims.

I claim:

1. In the process of separating propane and heavier hydrocarbons from a hydrocarbon feed gas mixture in an absorption zone by contacting said hydrocarbon feed gas mixture with a hydrocarbon absorption oil to dissolve propane and heavier hydrocarbons preferentially in said hydrocarbon absorption oil, the improvement in stripping said propane and heavier hydrocarbons from said hydrocarbon absorption oil for recycle of said hydrocarbon absorption oil to said absorption zone comprising removing said hydrocarbon absorption oil from said absorption zone, passing said hydrocarbon absorption oil to a stripping zone, heating a first stripping medium consisting substantially entirely of propane in a first heating zone, stripping butane and heavier hydrocarbons from said hydrocarbon absorption oil and substantially saturating said hydrocarbon absorption oil with propane by blowing said heated first stripping medium through said hydrocarbon absorption oil in said stripping zone, heating a second stripping medium consisting substantially entirely of methane and ethane in a second heating zone, stripping said propane from said hydrocarbon absorption oil and substantially saturating said hydrocarbon absorption oil with methane and ethane by blowing said heated second stripping medium through said hydrocarbon absorption oil, removing gaseous overhead from said stripping zone, condensing gaseous overhead from said stripping zone, passing said condensed overhead to a deethanization zone, subjecting said condensed overhead in said deethanization zone to fractionation to remove therefrom as overhead said second stripping medium consisting substantially entirely of methane and ethane, passing said overhead to said second heating zone, removing bottoms from said deethanization zone, passing said bottoms to a depropanization zone, subjecting said bottoms in said depropanization zone to fractionation to remove therefrom as overhead said first stripping medium consisting substantially entirely of propane, passing said overhead to said first heating zone, removing hydrocarbon absorption oil from said stripping zone, and recycling said hydrocarbon absorption oil to said absorption zone.

2. In the process of separating propane and heavier hydrocarbons from a hydrocarbon feed gas mixture in an absorption zone by contacting said hydrocarbon feed gas mixture with a hydrocarbon absorption oil to dissolve propane and heavier hydrocarbons preferentially in said hydrocarbon absorption oil, the improvement in stripping said propane and heavier hydrocarbons from said hydrocarbon absorption oil for recycle of said hydrocarbon absorption oil to said absorption zone comprising removing said hydrocarbon absorption oil from said absorption zone, passing said hydrocarbon absorption oil to a first stripping zone, heating a first stripping medium consisting substantially entirely of propane in a first heating zone, stripping said butane and heavier hydrocarbons from said hydrocarbon absorption oil and substantially saturating said hydrocarbon absorption oil with propane by blowing said heated first stripping medium through said hydrocarbon absorption oil in said first stripping zone, removing said hydrocarbon absorption oil from said first stripping zone, passing said hydrocarbon adsorption oil to a second stripping zone, heating a second stripping medium consisting substantially entirely of methane and ethane in a second heating zone, stripping said propane from said hydrocarbon absorption oil and substantially saturating said hydrocarbon absorption oil with methane and ethane by blowing said heated second stripping medium through said hydrocarbon absorption oil in said second stripping zone, removing gaseous overhead from said first stripping zone, condensing gaseous overhead from said first stripping zone, removing gaseous overhead from said second stripping zone, condensing gaseous overhead from said second stripping zone, passing said condensed overhead from said first and said second stripping zones to a deethanization zone, subjecting said condensed overhead in said deethanization zone to fractionation to remove therefrom as overhead said second stripping medium consisting substantially entirely of methane and ethane, passing said overhead to said second heating zone, removing bottoms from said deethanization zone, passing said bottoms to a depropanization zone, subjecting said bottoms in said depropanization zone to fractionation to remove therefrom as overhead said first stripping medium consisting substantially entirely of propane, passing said overhead to said first heating zone, removing hydrocarbon absorption oil from said stripping zone, and recycling said hydrocarbon absorption oil to said absorption zone.

References Cited in the file of this patent

UNITED STATES PATENTS

| | | |
|---|---|---|
| 2,038,314 | Ragatz | Apr. 21, 1936 |
| 2,249,884 | Carney | July 22, 1941 |
| 2,249,885 | Carney | July 22, 1941 |
| 2,290,957 | Hachmuth | July 28, 1942 |
| 2,307,024 | Carney | Jan. 5, 1943 |
| 2,345,934 | Gregory | Apr. 14, 1944 |
| 2,608,516 | Miller | Aug. 26, 1952 |
| 2,638,437 | Ragatz | May 12, 1953 |

OTHER REFERENCES

Middlebrook: "Oil and Gas Journal," vol. 49, pages 85–87 and 107–108 (1950), page 87 only needed.